May 3, 1949.　　　W. J. HEYNEMAN　　　2,469,300
TIRE
Filed Oct. 25, 1945

INVENTOR.
William J. Heyneman
BY Victor J. Evans & Co.
ATTORNEYS

Patented May 3, 1949

2,469,300

UNITED STATES PATENT OFFICE 2,469,300

TIRE

William J. Heyneman, Portsmouth, Va.

Application October 25, 1945, Serial No. 624,422

2 Claims. (Cl. 152—339)

This invention relates to a safe-ride inner tube which is especially adapted to eliminate the changes that arise from punctures and blowouts.

An object of this invention is to provide a device that regardless of the size of the hole made in the outside casing either by puncture or blowout, will permit the driver to retain control of his vehicle until a safe stop is made.

Another object of this invention is to provide a device that will permit a very small amount of air to leak from the tube at the time of the puncture or blowout.

A further object of the invention is to provide a device that is provided with a central partition or core which will function as a blowout patch.

With the above and other objects and advantages in view the invention consists of the novel details of construction, arrangement and combination of parts more fully hereinafter described, claimed and illustrated in the accompanying drawing in which:

Figure 1:
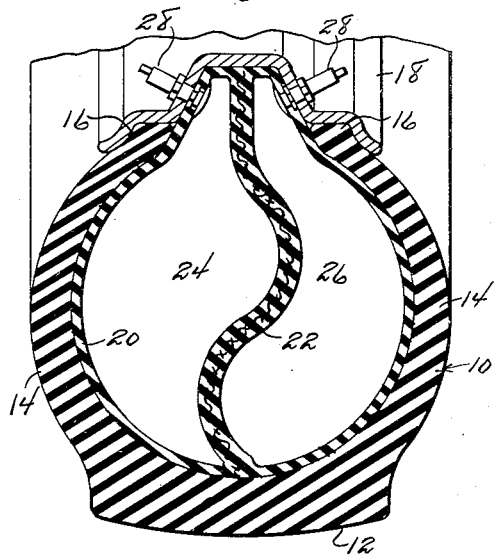
Figure 1 is a sectional view of an embodiment of the invention.
Figure 2:
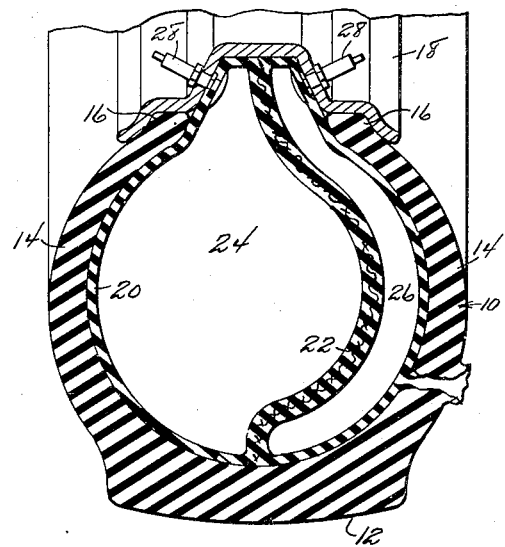
Figure 2 is the same with the tire and tube punctured or blown out.
Figure 3:
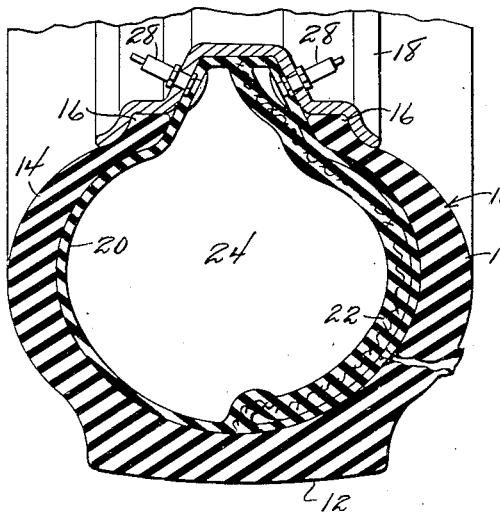
Figure 3 is the same with the inner core covering the puncture or blowout.
Figure 4:
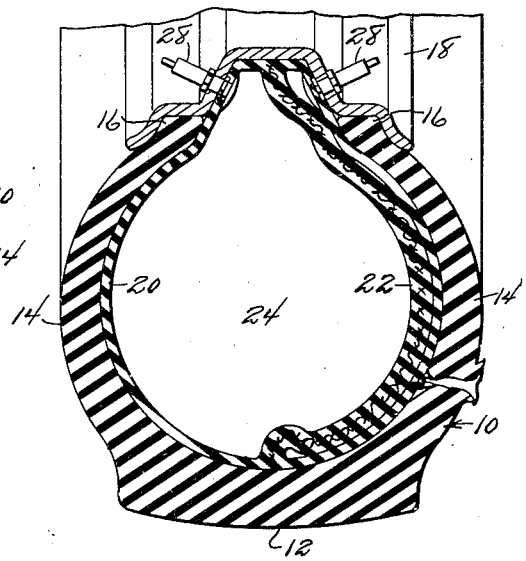
Figure 4 is the same with the tire casing, fully inflated and the core in position to prevent egress of air therefrom.

Referring more in detail to the drawing the reference numeral 10 designates the outer casing or tire of standard construction having the outer peripheral tread wall 12 and side walls 14 terminating in the peripheral beads 16 adapted to be seated in the usual wheel rim 18.

Removably disposed in the casing 10 is the tube 20 embodying the present invention, provided with a partition web 22 extending longitudinally and radially from the inner to the outer diameter thereof, and dividing the tube 20 into a plurality of separate and distinct sections 24 and 26 respectively. The length of the web is continuous throughout the tube and the width thereof is equal to substantially one-half of the inner transverse circumference of the tube.

As shown the partition 22 is shown arranged in the central plane of the rotation of the casing 10. The partition comprises a structure combining a cord reinforcing structure which is similar to the tire casing 10 and of a thickness greater than that of the tube.

The edges or connecting points of the partition 22, with tube 20 are integral and sufficiently strong to prevent the simultaneous deflation of both sections 24 and 26.

Both sections 24 and 26 are provided with the conventional air inlet valves 28 by which the tube 20 may be inflated.

Since the partition 22 is of greater width from its inner to its outer edge than the actual radial distance of the tube, the partition is permitted to bulge as indicated by the figures to rest against the inner peripheral surface of the tube to close any puncture or blowout occurring in the tube 20 and casing 10.

Since tire failures usually occur at the outside shoulder of the casing the chambers should be inflated with the outboard side of the casing receiving 40 percent of the air and the inboard side 60 percent of the air, thus inflated the tube cannot lose more than 40 or 60 percent of the air contained therein.

Thus in the event of casing failure, the vehicle can continue on its way without change of tire, all that is required is to inflate the remaining chamber to the desired pressure and the tire is available for full service.

It is believed that the operation and advantages as well as the construction of the device will be apparent to those skilled in the art and that it is to be understood that minor changes in the details of construction and arrangement of parts may be resorted to without departing from the spirit of the invention and the scope of the appended claims.

Having thus described the invention what is claimed as new and desired to be secured by Letters Patent is:

1. In an inner tube for pneumatic tires, the combination which comprises a tube having a continuous centrally disposed longitudinally and radially extended web providing a partition dividing the tube into two complementary sections, the width of said web being equal to substantially one-half of the inner transverse circumference of the tube whereby with one section of the tube deflated, the web will be forced against the inner surface thereof to cover a puncture or bridge a rupture therein, the edges of said web being integral with the material of the tube and, reinforcing cord structure embedded within the web therein throughout the width thereof, and covered on both sides with material corresponding to that of the tube whereby when the web is forced against the inner surface of the tube, the pressure of the remaining section will provide a snug fit to close a puncture or blowout, said web having a thickness greater than that of the wall of the tube whereby the punctured or ruptured wall of the tube is reinforced thereby when the web is positioned against the inner peripheral surface thereof.

2. In an inner tube for pneumatic tires, the combination which comprises a tube having a continuous centrally disposed longitudinally and radially extended web providing a partition dividing the tube into two complementary sections, the width of said web being equal to substantially one-half of the inner transverse circumference of the tube whereby with one section of the tube deflated, the web will be forced against the inner surface thereof to cover a puncture or bridge a rupture therein, the edges of said web being integral with the material of the tube, reinforcing cord structure embedded within the web therein throughout the width thereof, and covered on both sides with material corresponding to that of the tube whereby when the web is forced against the inner surface of the tube, the pressure of the remaining section will provide a snug fit to close a puncture or blowout, said web having a thickness greater than that of the wall of the tube whereby the punctured or ruptured wall of the tube is reinforced thereby when the web is positioned against the inner peripheral surface thereof, and valves in each of the sections of the tube whereby air is supplied to each section independently.

WILLIAM J. HEYNEMAN.

REFERENCES CITED

The following references are of record in the file of this patent:

UNITED STATES PATENTS

| Number | Name | Date |
|---|---|---|
| 543,862 | Gray | Aug. 6, 1895 |
| 1,138,544 | Dawson | May 4, 1915 |

FOREIGN PATENTS

| Number | Country | Date |
|---|---|---|
| 26,209 | Great Britain | 1908 |